United States Patent
Barani et al.

(10) Patent No.: US 6,710,505 B1
(45) Date of Patent: Mar. 23, 2004

(54) DIRECT DRIVE INSIDE-OUT BRUSHLESS ROLLER MOTOR

(75) Inventors: Moe K. Barani, Radford, VA (US); Ron Flanary, Blacksburg, VA (US); Lee Snider, Christiansburg, VA (US)

(73) Assignee: Aspen Motion Technologies, Inc., Radford, VA (US)

( * ) Notice: Subject to any disclaimer, the term of this patent is extended or adjusted under 35 U.S.C. 154(b) by 0 days.

(21) Appl. No.: 09/700,447
(22) PCT Filed: Jun. 11, 1999
(86) PCT No.: PCT/US99/13145
§ 371 (c)(1), (2), (4) Date: Feb. 6, 2001
(87) PCT Pub. No.: WO99/65134
PCT Pub. Date: Dec. 16, 1999

Related U.S. Application Data
(60) Provisional application No. 60/088,856, filed on Jun. 11, 1998.

(51) Int. Cl.[7] .......................... H02K 1/10; H02K 21/12; H02K 29/00; B65G 13/06
(52) U.S. Cl. .................... 310/261; 310/156.12; 310/90; 310/91; 198/788; 198/784
(58) Field of Search .................. 310/67 R, 68 B, 310/156.12, 156.29, 90, 91, 261, 264, 156.08, 89, 156.13, 156.15, 156.28; 198/618, 780, 784, 788, 781.05, 781.06; 29/596–598

(56) References Cited

U.S. PATENT DOCUMENTS

| | | | | |
|---|---|---|---|---|
| 1,868,825 A | * | 7/1932 | Grosjean | 198/788 |
| 1,881,267 A | * | 10/1932 | Drexler | 198/788 |
| 3,693,037 A | * | 9/1972 | West | 310/154 |
| 4,048,531 A | * | 9/1977 | Buess et al. | 310/49 R |
| 4,554,473 A | * | 11/1985 | Muller | 310/67 R |
| 4,575,652 A | * | 3/1986 | Gogue | 310/156 |
| 4,598,240 A | * | 7/1986 | Gale et al. | 318/254 |
| 4,604,665 A | * | 8/1986 | Muller et al. | 360/97 |
| 4,626,727 A | * | 12/1986 | Janson | 310/156 |
| 4,730,136 A | * | 3/1988 | Muller | 310/68 R |
| 4,841,186 A | * | 6/1989 | Feigel et al. | 310/156 |
| 4,882,511 A | * | 11/1989 | Heide | 310/67 R |
| 5,065,061 A | * | 11/1991 | Satoh et al. | 310/104 |
| 5,088,596 A | * | 2/1992 | Agnoff | 198/788 |
| 5,128,819 A | * | 7/1992 | Elsaesser et al. | 360/99.08 |
| 5,162,685 A | * | 11/1992 | Yamaguchi et al. | 310/156 |
| 5,180,344 A | * | 1/1993 | Hall | 474/148 |
| 5,200,661 A | * | 4/1993 | Shramo et al. | 310/184 |
| 5,233,250 A | * | 8/1993 | Filippis | 310/67 R |
| 5,413,209 A | * | 5/1995 | Werner | 198/500 |
| 5,448,117 A | * | 9/1995 | Elliott | 310/49 R |
| 5,462,156 A | * | 10/1995 | Kobayashi et al. | 198/788 |
| 5,834,866 A | * | 11/1998 | Fujitani et al. | 310/49 R |
| 5,962,938 A | * | 10/1999 | Bobay et al. | 310/156 |
| 6,057,616 A | * | 5/2000 | Pelstring | 310/156 |
| 6,206,181 B1 | * | 3/2001 | Syverson | 198/788 |
| 6,244,427 B1 | * | 6/2001 | Syverson | 198/788 |

* cited by examiner

Primary Examiner—Tran Nguyen
(74) Attorney, Agent, or Firm—Quarles & Brady LLP

(57) ABSTRACT

A brushless d.c. motor is integrated with a conveyor roller (14) by placing a plurality of stator coils (15) on a stationary shaft (18) and securing a rotor (10) with segments (12) of permanent magnetic material to the inside of the conveyor roller (14). In one embodiment the rotor (10) is directly secured to the roller while in a second embodiment, the rotor (10) is disposed inside of a cylindrical metal housing (40) that is press fit inside of the roller. Commutation is provided by an external motor controller (54) which is connected by conductors (37) through a passageway (36) in the shaft (18) to a circuit board (20), where sensors (23) are mounted to sense rotor position for purposes of commutation of the stator coils (15).

10 Claims, 4 Drawing Sheets

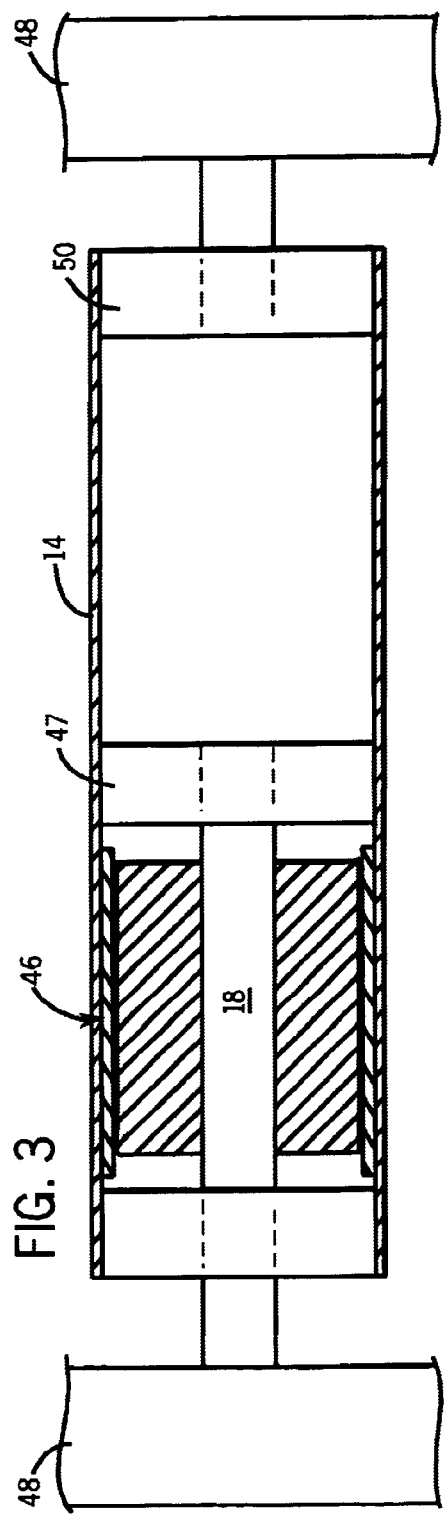
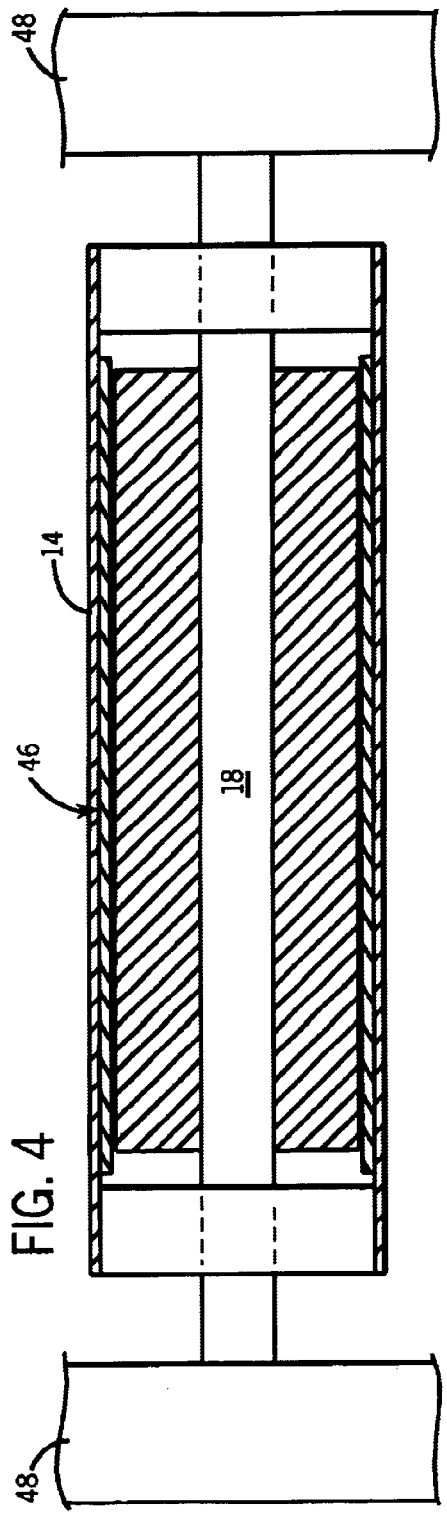

DIRECT DRIVE INSIDE-OUT BRUSHLESS ROLLER MOTOR

This application claims the benefit of provisional application ser. No. 60/088,856 filed Jun. 11, 1998.

FIELD OF THE INVENTION

This invention relates to an improved motor driven roller in which the motor is located inside the roller and, more particularly, to such a motor driven roller in which the motor directly drives the roller.

DESCRIPTION OF THE PRIOR ART

Motor-driven rollers are used in a variety of applications. Among these applications are the rollers used in exercise treadmills and in material handling conveyors. The specific embodiment of the invention, described in this patent specification, is directed to a conveyor application. However, it will be appreciated the invention is applicable to motor driven rollers used in other systems, such as treadmills.

In a widely used prior art motor driven conveyor roller, a brushless, permanent magnet, d.c. motor is housed inside the roller itself. The motor, which is necessarily limited in size, has a relatively low torque. Typically, a conveyor roller has an inside diameter of less than two inches. A reducing gear is needed to couple the motor rotor to the roller in order to generate the torque required for the conveyor roller application. A resilient clutch is used to uncouple the motor from the roller in those situations where the roller becomes stuck. While generally satisfactory, the reducing gear requires maintenance and is subject to breaking down, which requires disassembly of the roller and repair or replacement of the broken parts.

SUMMARY OF THE INVENTION

An object of this invention is the provision of an electronically controlled, high torque d.c. motor assembly housed inside the roller and directly connected to it, which eliminates the need for a reduction gear and a clutch control used in the prior art.

Briefly, this invention contemplates the provision of a motorized roller in which a cylindrical permanent magnet is secured to the inside surface of the roller. Longitudinal segments are magnetized to form poles of alternate north and south magnetic polarity. These magnet poles are the rotor of an inside-out brushless d.c. motor, the stator of which is formed by coils in slots in a toothed structure mounted on a stationary shaft about which the permanent magnet rotor and the roller to which it is attached rotates. Preferably, the number of rotor poles is, or is close to, the maximum number of poles that can be formed about the circumference of the cylindrical permanent magnet, given the constraint on the diameter of the permanent magnet since it much fit within the roller, and the constraint of practical manufacturing limitations. Increasing the number of magnetic poles decreases the required thickness of the back iron which is needed to generate a high flux density in the air gap, which in turn is necessary to generate a high torque output per unit volume. It will be appreciated that the required back iron thickness is approximately equal to the ratio of the number of magnetic flux lines per pole to the acceptable back iron flux density level. As the number of poles increases, the magnetic lines per pole decrease, since the magnetic flux is evenly distributed among the poles.

The stator coils are electronically commutated to provide brushless operation. One end of the stator shaft extends beyond the end of the roller and is secured to a suitable frame member. Wires in a passage in the shaft carry current to the coils. Preferably, six-step switching is used to commutate the stator coils and the commutation angle can be advanced as the motor speed increases in order to maintain a desired torque. In one embodiment, the motor extends the length of the roller. In another embodiment, the motor extends for only a part of the length of the roller. The permanent magnet in which the poles are formed may be secured to the inside of the roller by means of a suitable adhesive. Here, the roller itself serves as the back iron to provide a low reluctance path to complete the magnetic circuit between adjacent poles. In another embodiment, the entire motor assembly is secured in a metal housing, which is then secured to the roller by force fit or other suitable means. Here the metal housing serves as the back iron member.

BRIEF DESCRIPTION OF THE DRAWINGS

The foregoing and other objects, aspects and advantages will be better understood from the following detailed description of a preferred embodiment of the invention in which:

FIG. 3 is a schematic view of a modified form of the roller and motor combination of either FIG. 1 or FIG. 2 in which the motor extends for only a part of the length of the roller.

FIG. 4 is a schematic view similar to FIG. 3 where the motor extends substantially the entire length of the roller.

DETAILED DESCRIPTION OF THE PREFERRED EMBODIMENTS

Figure 1:
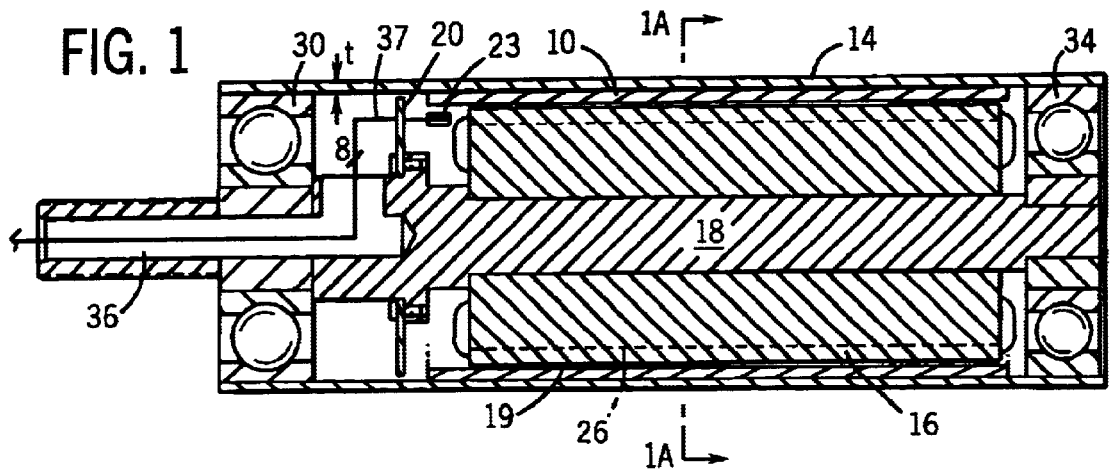
FIG. 1 is a longitudinal, sectional view of one embodiment of motor and roller combination in accordance with the teachings of the invention.
Figure 1A:
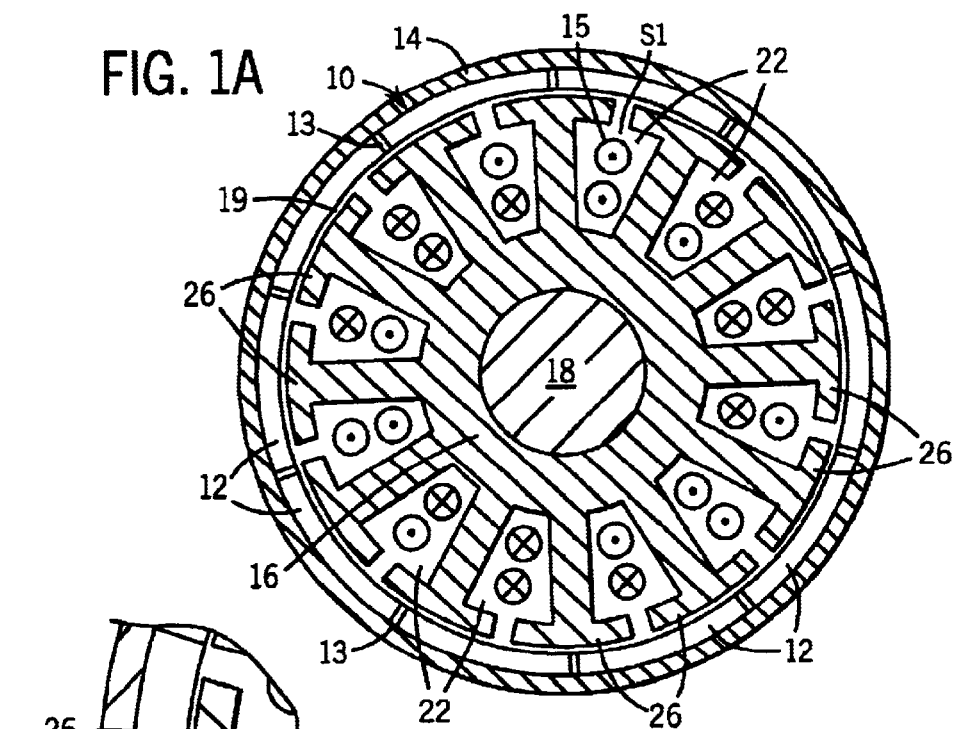
FIG. 1A is a transverse sectional view taken in the plane indicated by line 1A—1A in FIG. 1.
Figure 1B:
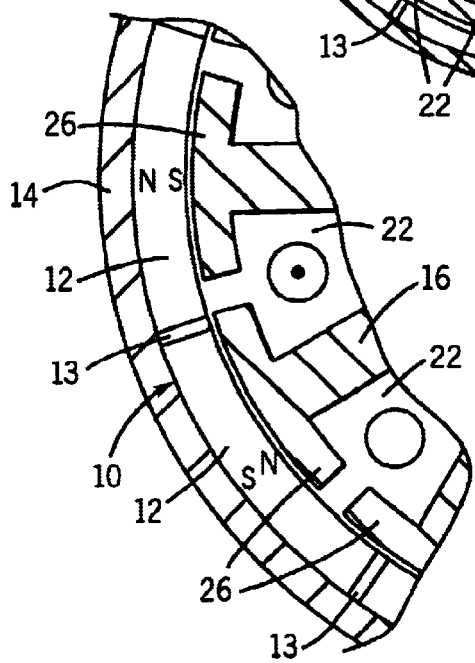
FIG. 1B is an enlarged fragmentary view of a portion of FIG. 1A.

Referring now to FIGS. 1 and 1A, in this embodiment of the invention, a cylinder 10 having a plurality of permanent magnets 12 is secured to the inside surface of a conveyor roller 14 by a suitable adhesive, for example. The thickness "t" of a typical conveyor roller wall is approximately roughly 1/16 of an inch. The permanent magnets 12 may be of any suitable magnetic material, such as neodium-iron-boron. As illustrated in FIG. 1A, longitudinal segments 12 of the cylinder 10 are magnetized to form magnetic poles with adjacent segments of opposite magnetic polarity, as indicated by the letters, N and S in FIG. 1B. The magnetized segments 12 are separated by narrow gaps of material 13 that are not magnetized under ordinary operating conditions. Since the magnetic flux generated by the cylinder 10 is a function of its surface area (i.e. Magnetic Flux=Magnetic Flux Density X Magnet Area), it will be appreciated this configuration provides a large magnetic surface area and hence a large magnetic flux.

A laminated toothed member 16, which is affixed to a shaft 18, is separated from the inner surfaces of cylinder 10 by an air gap 19. Stator coils 15 are disposed in slots 22 formed by teeth 26. The coils 15 each have at least thirteen turns, with only one turn per coil being shown for illustration purposes. Each coil 15 encircles only a single tooth 26. The coils in carry current supplied in three phases, A, B and C. In a preferred embodiment of the invention, a three-phase stator is used, with four coils per phase and two coil half-sections in each slot 22. Slot 1 is designated S1 in FIGS. 1A and 2A. Slot 1 is located between "tooth 12" and "tooth 1" of the stator 16. The phase A coils are disposed in the slots 22 to encircle "tooth 12", "tooth 1", "tooth 6" and "tooth 7." The phase B coils are disposed in the slots 22 to encircle "tooth 2", "tooth 3", "tooth 8" and "tooth 9". The phase C coils are disposed in the slots 22 to encircle "tooth 4", "tooth 5", "tooth 10" and "tooth 11".

The motor of the present invention develops a high back EMF so as to provide a higher ratio of stator voltage to rotor speed than the prior art. In the prior art, this ratio was about 1.5. In a preferred embodiment, according to FIG. 3, in which the stator is three inches long, and in which each stator coil has at least 13 turns of 21 AWG guage wire per coil, a ratio of 10 RMS volts per 1000 RPM of rotor speed can be obtained, with the nominal stator voltage on each of the three phases being a 24-volt RMS PWM signal. By varying the number of turns, other guages of wire will provide the same results. If the nominal stator voltage were doubled to 48 RMS volts, then this ratio would be doubled to 20 RMS volts per 1000 RPM to provide suitable performance.

The coils are electronically commutated, for example, by a six-step commutation control algorithm. Although six-step commutation is preferred, other types of commutation including sine wave commutation may be employed. Here it will be appreciated this brushless commutation requires a means to determine the angular position of the rotor with respect to the stator coils 15. Three Hall effect sensors 23 are angularly spaced 120° apart and are supported on an annular circuit board 20. As the pole segments 12 pass by, sets of three signals are provided from the Hall effect sensors 23, and these three-signal sets are decoded to determine angular position signals which are then used for controlling commutation.

The number of pole segments 12 is preferably made as large as it is practical to manufacture without reducing the magnetizable area. For example, with the inside diameter of the magnetic cylinder 10 on the order of one inch, it is practical to form about twelve pole piece segments. By increasing the number of poles, for a given flux density, the thickness of the back iron required of a low reluctance magnetic flux return path is decreased so that the roller 14 can provide this function, resulting in an increased torque output per unit volume. As the number of poles increases, the flux lines per pole decreases, since the density is distributed evenly among the number of poles. Consequently, the thickness of the back iron decreases as the number of poles increases. The minimum number of poles for any motor is two. The ratio of the back iron thickness for a two pole to the back iron thickness for a motor with "N" poles is approximately N divided by 2. In order to keep the overall diameter of the motor sufficiently small to fit inside the rollers, while at the same time generating sufficient torque directly to drive the motor, at least six poles and preferably ten poles (as illustrated) should be used.

The shaft 18 extends outwardly from the roller so that it can be secured to the frame of the conveyor. The outer peripheral surface of a bearing 30 at this end of the shaft is affixed to the inner surface of the roller 14. The outer peripheral surface of another bearing 34, at the other end of the shaft 18, is also affixed to the inner surface of the roller 14. These bearings are all rotatably mounted on the shaft 18 and allow the permanent magnet 10 along with the roller 14 to which it is affixed to rotate relatively to the fixed shaft 18 while maintaining the air gap 19 between the inner surface of the magnets and the outer periphery of toothed member 16. Conductors 37 are disposed in a passageway 36 in the shaft 18, including three phase conductors to provide power to the stator coils 15 from an external power source.

Figure 2:
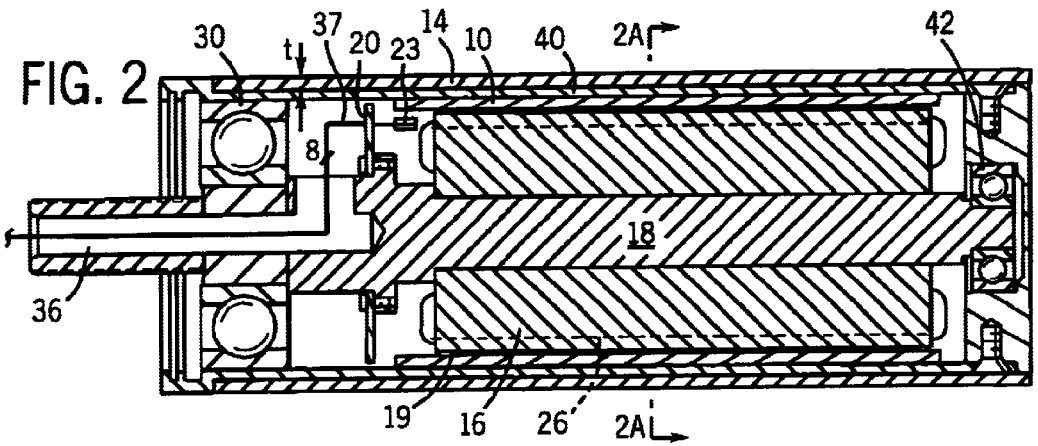
FIG. 2 is a longitudinal, sectional view of a second embodiment of the motor and roller combination in accordance with the teachings of the invention.
Figure 2A:
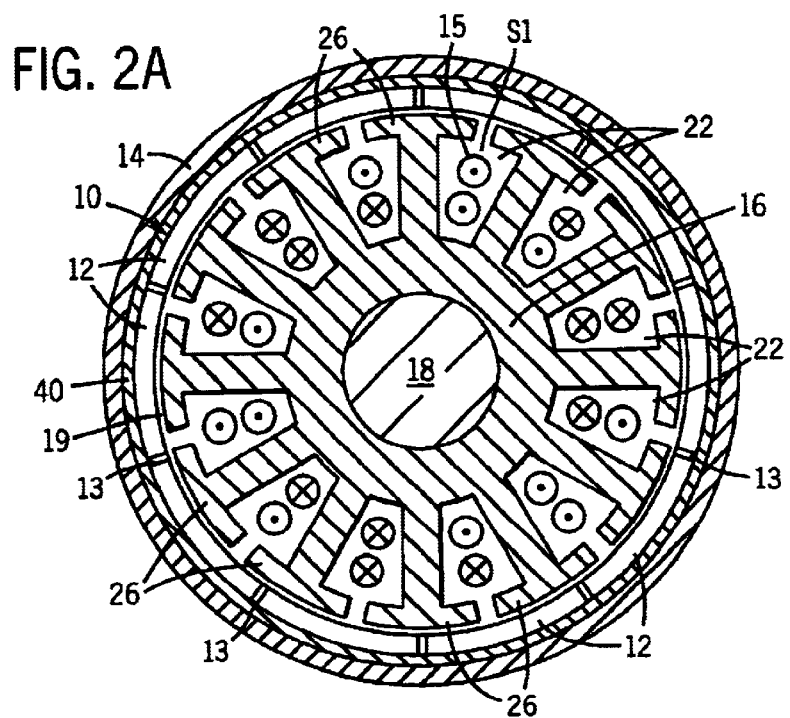
FIG. 2A is a transverse sectional view taken in the plane indicated by line 2A—2A in FIG. 2.

Referring now to FIGS. 2 and 2A, in which like reference numbers have been used to designate like parts in FIG. 1, in this embodiment of the invention, the roller motor is first assembled in a cylindrical metal housing 40 which, in turn, is secured to the inner surface of the roller 14. The thickness of the wall of the housing is preferably minimized in order to maximize the diameter of the cylinder 10 which in turn maximizes torque. In a preferred embodiment, the housing 40 is secured to the roller 14 by a forced friction fit between the outer surface of the housing 40 and the inner surface of the roller 14 for at least a portion of their lengths. That is, the nominal outside diameter of the housing is slightly larger than the nominal inside diameter of the roller for at least a portion of their lengths. The housing 40 is closed at one end and a bearing 42 rotatably supports this end of the housing on the shaft 18. In lieu of the press fit, adhesive may be used to secure the housing 40 to the roller 14, or the adhesive may be used in addition to the press fit. In this embodiment of the invention, the housing 40 provides the back iron path for the pole segments 12.

Referring now to FIG. 3, in one embodiment of the invention the motor (here indicated by the reference number 46) extends only for part of the length of the roller 14, which is supported by frame members 48. The shaft 18 in this embodiment needs to extend the length of the roller, but may be supported by a bearing 47 inside the roller. The other side of the roller 14 is supported by a shaft 49 affixed to the frame 48 and a bearing 50 rotatable about the shaft and affixed to the roller 14.

In the embodiment of FIG. 4, the motor 46 does extend substantially the entire length of the roller. Here it will be appreciated the volume of the motor increases, and the torque which it can generate, which is a function of volume, also increases.

Figure 5:
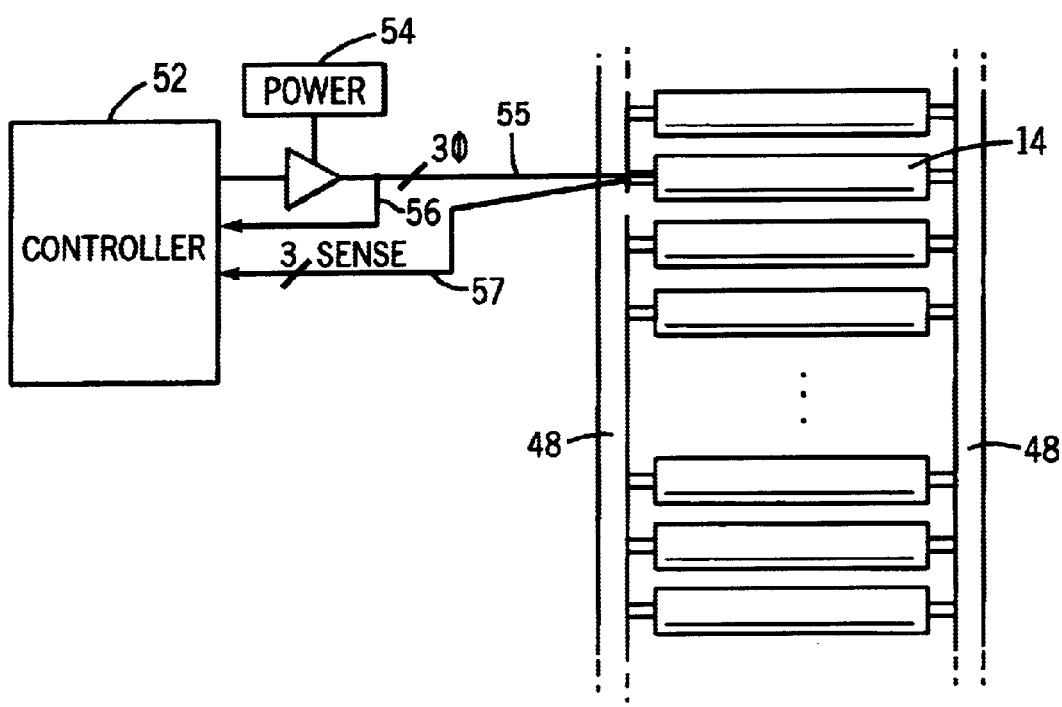
FIG. 5 is a schematic drawing of a control system for the roller motor of a conveyor roller driven by an inside-out, brushless, permanent magnet, d.c. motor in accordance with the teachings of this invention.

FIG. 5 is a schematic diagram illustrating one embodiment of how the roller motor can be energized. Here a six-step conmutating controller 52 connects a three-phase power supply 54 to the motor's stator coils (shown in FIGS. 1 and 2) through three phase conductors 55 entering through the shaft of the roller 14. The rotor position sensors 23 (for example a Hall effect sensor) (shown in FIGS. 1 and 2) provide commutating signals to controller 52 through three sense lines 57. A current sensing line 56 provides a signal to the controller 52 to indicate when a roller is stuck (i.e. the input current excess a predetermined threshold) so that the controller can cut off power to the jammed roller. If desired, the controller 52 can provide short duration power pulses to the motor after power has been cut off, to see if the roller has become freed, and if it has to resume supplying power to the motor.

While the invention has been described in terms of a single preferred embodiment, those skilled in the art will recognize that the invention can be practiced with modification within the spirit and scope of the appended claims.

We claim:

1. A motor for driving a cylindrical conveyor roller that rotates around a stationary shaft, said conveyor roller having a first end and a second end, the motor comprising:

a cylindrical rotor disposed inside of and mounted to rotate with said cylindrical roller around said stationary shaft;

wherein said rotor is formed of a plurality of longitudinal segments of permanent magnetic material, wherein said segments alternate orientation of north-south magnetic polarity in a radial direction to produce flux in flux path loops connecting pairs of the longitudinal segments;

a plurality of stator coils mounted on said shaft for receiving current from an external power supply that commutates current in said stator coils;

wherein said motor is a brushless d.c. motor;

further comprising a cylindrical metal rotor housing forming a part of the rotor for receiving the segments of permanent magnetic material and for supporting the shaft and the stator coils in a motor assembly;

wherein said motor assembly, including said cylindrical metal rotor housing, is disposed inside of and secured to said roller to rotate with the roller;

wherein said motor is supported by two spaced apart bearings which space the rotor from the stator to form an air gap; and wherein a first one of said bearings is proximate the first end of the conveyor roller and wherein a second one of said bearings is spaced a distance away from said first one of said bearings to provide the air gap for spacing the rotor from the stator; and wherein said stationary shaft extends only between said first one of the bearings and said second one of the bearings, which is a distance less than a distance between said first end and said second end of said conveyor roller.

2. A motor for driving a cylindrical conveyor roller that rotates around a stationary shaft, said conveyor roller having a first end and a second end, the motor comprising:

a cylindrical rotor disposed inside of and mounted to rotate with said cylindrical roller around said stationary shaft;

wherein said rotor is formed of a plurality of longitudinal segments of permanent magnetic material, wherein said segments alternate orientation of north-south magnetic polarity in a radial direction to produce flux in flux path loops connecting pairs of the longitudinal segments;

a plurality of stator coils mounted on said shaft for receiving current from an external power supply that commutates current in said stator coils;

wherein said motor is a brushless d.c. motor;

further comprising a cylindrical metal rotor housing forming a part of the rotor for receiving the segments of permanent magnetic material and for supporting the shaft and the stator coils in a motor assembly;

wherein said motor assembly, including said cylindrical metal rotor housing, is disposed inside of and secured to said roller to rotate with the roller;

wherein said motor is supported by two spaced apart bearings which space the rotor from the stator to form an air gap; and wherein a first one of said bearings is proximate the first end of the conveyor roller and wherein a second one of said bearings is spaced a distance away from said first one of said bearings to provide the air gap for spacing the rotor from the stator, and wherein said conveyor roller extends beyond said second one of said bearings and to a greater length than the brushless d.c. motor, and further comprising a third bearing disposed beyond said second one of said bearings and proximate the second end of the conveyor roller for rotatably supporting the conveyor roller; and wherein said stationary shaft extends only between said first one of the bearings and said second one of the bearings, which is a distance less than a distance between said first end and said second end of said conveyor roller.

3. The motor of claim 1 or 2, wherein said rotor is connected to directly drive said roller without the use of a reduction gear assembly.

4. The motor of claim 1 or 2, wherein the rotor housing is fastened to the conveyor roller by an interference fit.

5. The motor of claim 1 or 2, wherein said plurality of poles includes at least six poles formed in said cylindrical member as longitudinal segments with segments of alternating north-south magnetic polarity with said roller providing a magnetic path between segments.

6. The motor of claim 1 or 2, wherein the stator coils are formed of a number of turns and a gauge of wire selected to produce a ratio of stator voltage to speed of at least 10 RMS volts per 1000 RPM for an applied stator voltage of 24 RMS volts per phase.

7. The motor of claim 1 or 2, wherein the stator has a plurality of teeth, and wherein each stator coil encircles a single stator tooth.

8. The motor of claim 1 or 2, further comprising a position sensor for detecting a rotational position of the rotor.

9. The motor of claim 8, wherein the position sensor comprises three Hall-effect devices mounted on a circuit board disposed within the motor housing.

10. The motor of claim 8, in combination with an electronic controller, said electronic controller sensing rotational position of the rotor from the position sensor and controlling commutation of current supplied to the stator coils.

\* \* \* \* \*

UNITED STATES PATENT AND TRADEMARK OFFICE
CERTIFICATE OF CORRECTION

PATENT NO. : 6,710,505 B1
DATED : March 23, 2004
INVENTOR(S) : Moe K. Barani et al.

It is certified that error appears in the above-identified patent and that said Letters Patent is hereby corrected as shown below:

Column 3,
Line 9, "coils in carry" should be -- coils 15 carry --.

Column 4,
Line 52, "conmutating" should be -- commutating --.

Signed and Sealed this

Twenty-third Day of November, 2004

JON W. DUDAS
*Director of the United States Patent and Trademark Office*